No. 843,189. PATENTED FEB. 5, 1907.
G. M. WILLIS.
MEASURING INSTRUMENT.
APPLICATION FILED FEB. 12, 1904.

Witnesses:

Inventor
George M. Willis
By Charles A. Brown
Attorney

No. 843,189. PATENTED FEB. 5, 1907.
G. M. WILLIS.
MEASURING INSTRUMENT.
APPLICATION FILED FEB. 12, 1904.

Witnesses:
Leonard W. Novander
Charles J. Schmidt.

Inventor
George M. Willis
By Charles A. Brown
Attorney

No. 843,189. PATENTED FEB. 5, 1907.
G. M. WILLIS.
MEASURING INSTRUMENT.
APPLICATION FILED FEB. 12, 1904.

Witnesses:

Inventor
George M. Willis
By Charles A. Brown
Attorney

UNITED STATES PATENT OFFICE.

GEORGE M. WILLIS, OF CHICAGO, ILLINOIS.

MEASURING INSTRUMENT.

No. 843,189.　　　　Specification of Letters Patent.　　　　Patented Feb. 5, 1907.

Application filed February 12, 1904. Serial No. 193,252.

*To all whom it may concern:*

Be it known that I, GEORGE M. WILLIS, a citizen of the United States, residing at Chicago, in the county of Cook and State of Illinois, have invented a certain new and useful Improvement in Measuring Instruments, (Case 3,) of which the following is a full, clear, concise, and exact description, reference being had to the accompanying drawings, forming a part of this specification.

My invention relates to measuring instruments; and its object is to provide improved means whereby a collective and a continuous record may be taken of the individual instantaneous readings of the instrument.

My invention is adaptable to any instrument, either mechanical or electrical, in which a needle or pointer is actuated in correspondence with changes in the power or quantity measured, but is of particular adaptation in the electrical art for producing a continuous record of the instantaneous readings of an electrical instrument of any kind—for instance, such as a voltmeter, ammeter, or wattmeter.

In recording instruments now employed mechanical apparatus is associated with a needle, and the kind commonly employed provides a disk or cylinder driven by clockwork, upon which is mounted a record disk or sheet. The needle connected with the circuit to be recorded is provided with a marking-point, usually a pen or pencil, which is in contact with the record-sheet, and the combined movement of the record-sheet and the pen or pencil engaging therewith produces the so-called "curve" of pressure, current, power, or the like. The friction entailed by such construction between the marking-point and the record-sheet destroys the sensitiveness of the needle and at the same time requires a large amount of power for its operation to overcome this friction.

My invention contemplates the production of a record by means of electric sparks which pass through the record-sheet and carry with them some marking substance to leave marks on the record-sheet. This marking substance may be carbon or some coloring-matter placed in the path of the sparks; but I prefer to use a sheet of paper having a carbon surface, which makes it conductive to current, and the sparks jumping from this carbon-paper carry with them carbon particles and deposit them on and in the record-sheet, which is moved at a uniform rate, the carbon-paper traveling with it. I shall describe induction-coil mechanism for producing these electric sparks, although it is obvious that many other spark-producing means may be employed.

The indicating-needles employed on measuring instruments are usually provided with a counterweight at their tail end, and I replace this counterweight by a short extension, which, however, is entirely insulated from the needle. Two contact or spark points extend from this extension, a segmental conductor being disposed near the path of one of said points as the needle swings, but at all times separated from said point by an air-gap, the other spark-point as the needle swings passing by a series of spark-pins disposed in an arc of a circle, each pin being disposed diametrically opposite a corresponding division-point on the scale over which the indicating-needle swings. This spark-point is also separated at all times from the spark-pins by an air-gap. These spark-pins electrically connect with an equal number of spark-pins disposed equidistant in a straight line to register with the equidistant division-lines on a record-sheet, the record-sheet passing over these horizontally-alined spark-points, but also separated therefrom by an air-gap. The carbon-paper passes over a conductor-rod connecting with one terminal of the secondary winding of an induction-coil, the other terminal of the secondary winding connecting with the segmental conductor. The primary winding of the induction-coil is connected in circuit with a source of current, a high resistance, and a make-and-break mechanism, a condenser being shunted about the source of current and the resistance. When the contact at the make-and-break mechanism is open, the current from the source flows into the condenser to charge it, and as the contact is closed the condenser is discharged through the primary winding, inducing in the secondary winding a current which will flow from the secondary winding to the conductor-rod, through the carbon-paper or other marking substance, through the record-sheet to that spark-pin below the record-sheet connected with the spark-pin which is nearest the spark-point at the end of the needle, the current passing from the other spark-point on the needle to the segmental conductor and back to the opposite end of the secondary winding. The secondary circuit is thus completed by sparks at three places—namely, between the carbon-paper and the spark-pin below the record-sheet, between the other corresponding spark-point and the spark-point at the end of the needle, and between the other spark-point on the needle and the segmental conductor. Thus the needle is not frictionally connected in any way with the apparatus or with the circuits. Consequently no friction whatever is introduced. By a proper proportionment between the condenser capacity and the self-induction and resistance of the induction-coil windings and also by connecting the condenser in circuit as described I am enabled to produce a very long spark with an amount of current which is so small as to be practically negligible.

To prevent disturbance of the needle when a spark passes, the contacts should be so disposed that sparks may jump from a surface to a surface, from a point to a surface, or, as shown, from a surface to a point, so that the resultant thrust of the sparks passing to the needle will be longitudinal with the needle. I find by arranging the spark contacts in any other position that the needle will be disturbed when a spark passes, and consequently error will result in the reading of the instrument.

The primary circuit may be supplied with current from a battery or may be connected with any dynamic source of current available where the instrument is employed, and the instrument will indicate instantaneous values while it is also making a record of these values.

My invention will be more clearly understood by reference to the accompanying drawings, in which I have shown its adaptation for recording the readings of a voltmeter.

An upright bearing-frame 1 is secured to the top of the cover 2 by means of metal pieces 3 3 and provides bearings 4 4 and slot-bearings 5 5. A bar 6 is supported in bearings 4 4. A roller 7 is journaled in the slots 5 5, and above this roller is disposed another roller 8, also journaled in the slots 5 5. The bar 6 supports a roll 9, of record-paper, which paper passes over said roll and loops about the roller 8, then passes between the rollers 8 and 7 and loops about the roller 7, the end of the paper from there passing into a slot 10 in the drum 11. A rod 12, of conductive material, connects the metallic pieces 3 3, and a belt 13, of carbon-coated or otherwise-prepared paper, passes over the top of this rod and loops about the roller 7 below the record-paper passing about said roller. A series of spark-pins 14 14 extends through the cover 2 of the instrument, the pins being disposed in a horizontal line parallel to the axis of the roller 7, and an air-gap may be maintained between these pins and the record-paper passing about the roller 7. Another series of contact-pins 16 16 also extends into said cover 2 and downwardly therefrom. These pins are disposed in an arc of a circle, each of said pins being connected with a corresponding pin disposed in the horizontal line. By thus disposing spark-pins in a horizontal row and equally spaced apart the record-sheet may also have equally spaced vertical record-lines.

I remove the counterweight usually present at the end of the instrument-needle, and I substitute therefor an extension-piece 17, which, however, is well insulated from the needle 18, preferably by means of a glass sleeve 19, which may be filled with some resinous or other non-conducting compound. Two spark-points 20 and 21 are provided on said extension, and, as shown, these points may be terminals of a thin wire 22, wound about the extension 17. The spark-point 21 extends from the end of the extension 17, and as the needle swings this point passes by the spark-pins 16 16, but always separated therefrom by an air-gap. The spark-point 20 extends downwardly from the extension 17 and as the needle swings passes along a segmental conductor 23, being always separated therefrom, however, by an air-gap. Each of the spark-pins 16 is disposed diametrically opposite a corresponding division on the scale 24, over which the needle travels, and corresponding spark-pins 16 and 14 may be connected together by wire conductors 25. An induction-coil 26 is mounted in the instrument-box and for convenience in construction is composed of sections 27 27 of the secondary winding 28, connected serially together. The secondary circuit may be traced from one terminal of the secondary winding to the conductor-rod 12, from there through the conductive carbon-paper to one of the spark-pins 14 and to the corresponding spark-pin 16 to the spark-point 21, and from the spark-point 20 to the segmental conductor 23, back to the other terminal of the secondary winding. The primary circuit of the induction-coil extends from the primary winding 28' to a terminal post 29, then through a source of current 30 for supplying the primary circuit, then to the binding-post 31, through resistance-coils 32, through a make-and-break mechanism 33, back to the primary winding. A condenser 34, secured in the instrument-box, connects with the binding-post 29 and with the resistance 32 to be in bridge of the resistance and the source of current 30. The makeand-break mechanism is driven by clockwork 35, which serves also to drive the drum 11, and in order that the drum 11 may be turned independently of the clockwork and the make-and-break mechanism for the purpose of tightening or adjusting the record-paper I provide a friction-clutch 36 between the shaft 37, supporting the drum, and the cog-wheel 38, loosely mounted thereon. The shaft 37 terminates in a stud 39, and a nut 40 serves to clamp a spring-spider 41 against a disk 42, between which disk and the cog-wheel 38 are disposed disks 43, which may be of paper or other material. The spring-spider is adjusted to provide only sufficient friction to enable the clockwork to drive the drum; but to adjust or to tighten the record-paper the drum may be rotated by hand independently of the clockwork and in either direction. The clockwork for driving the drum and the make-and-break mechanism may be of simple construction and can be bought finished on the market.

I have somewhat modified the arrangement of the escapement-shaft and spring, and I connect one terminal of the primary circuit to the free end of the escapement-spring 44, the other end of the spring engaging the pinion-shaft 45, upon which shaft I mount a contact-arm 46, and before this contact-arm I provide a contact-screw 47, held by a support 48. The contact-arm 46 may be provided with a platinum point 48', and the contact-screw 47 may be provided with a platinum contact-point 49. With this adjustment I obtain closure of the contact-points 46 and 47 every half-second, although the arrangement may be such that more or less contacts may be made per second. When the contacts are disengaged, the source of current 30 serves to charge the condenser 34, and when the contacts engage the condenser discharges through the primary winding of the induction-coil, the charge being induced upon the secondary winding, and a spark will jump from the carbon-paper through the record-paper to the spark-pin and from the corresponding spark-pin to the end of the needle and from the needle to the segmental conductor. The sparks from the carbon-paper to the spark-point below the record-sheet carry with them carbon particles and deposit them on and in the record-sheet, which moves at a uniform rate over the spark-pins. I provide the roller 7 with a layer 50, of insulating material, for the purpose of preventing spreading or travel of the sparks along the roller, and the spark is compelled to jump to that spark-pin which is connected with the spark-point nearest to the end of the needle, and the corresponding reading of the needle at that time is recorded on the record-sheet by the carbon particles carried by the spark, and as the record-paper travels along the readings of the needle are recorded on the record-paper every half-second. In order to prevent clogging up of the contact-pins 14, due to the carbon carried through the record-paper and about said pins, I extend these pins a slight distance beyond the upper surface of the instrument-cover 2.

I find that by properly proportioning the capacity of the condenser and the inductance and resistance windings of the induction-coil and by connecting the condenser in circuit, as shown, I can produce a very long spark with a current so small as to be practically negligible, the condenser being preferably of comparatively large capacity and the circuit-breaker of sufficiently low frequency to allow the condenser to absorb full voltage before discharging through the primary winding.

Although a spark-discharge gives better results, the discharge at the gaps might be in the form of brush or spray discharges, and a record will be traced just as well. The record will therefore continue even though the power supplying the primary circuit be suddenly reduced to be too weak to produce a spark-discharge at the gaps.

Figure 1:
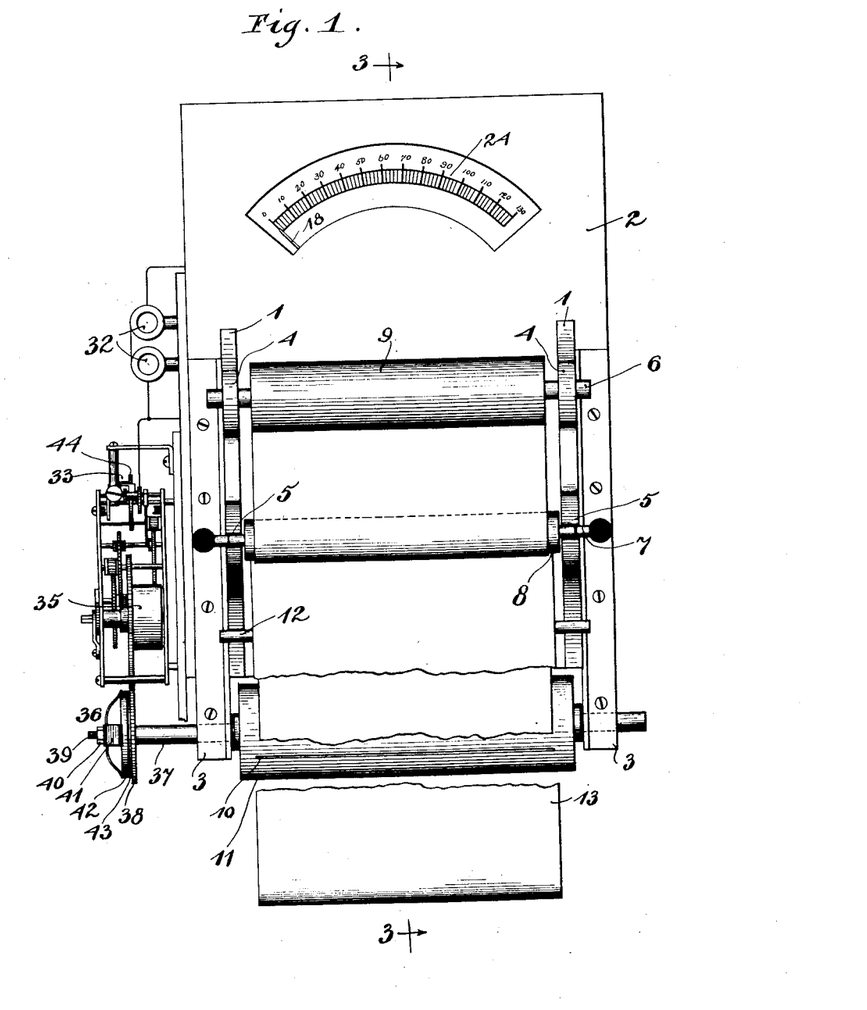
Figure 1 is a plan view of my invention applied to a measuring instrument.
Figures 2, 5:
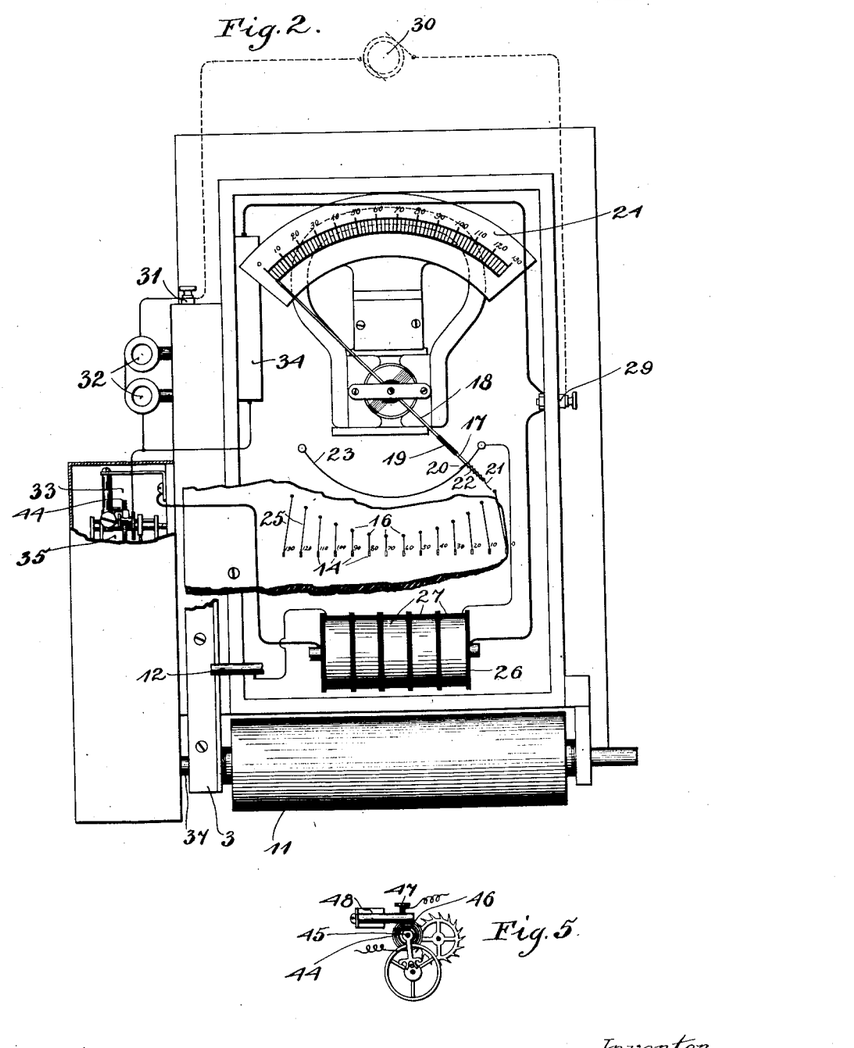
Fig. 2 is a plan view, the cover of the instrument and the parts supported thereon being removed.
Fig. 5 is an enlarged detailed view of a make-and-break mechanism.
Figure 3:
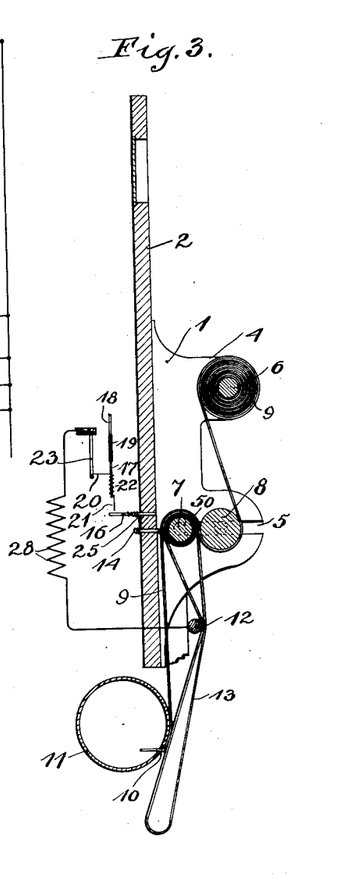
Fig. 3 is a sectional view taken on line 3 3 of Fig. 1.
Figure 4:
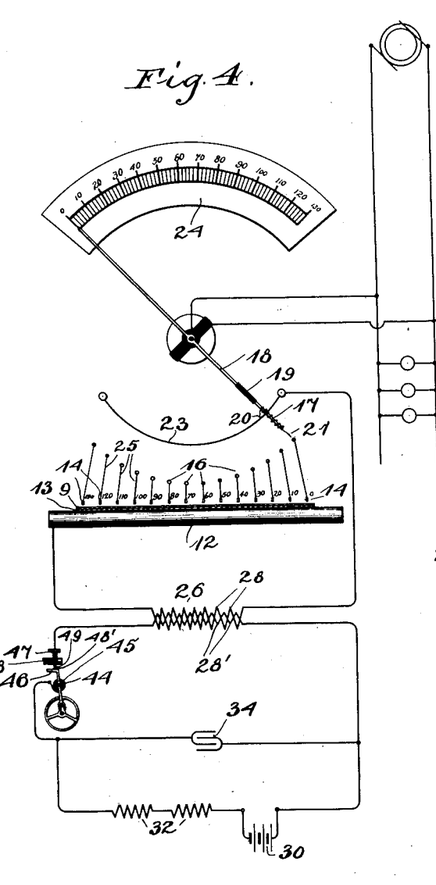
Fig. 4 shows a diagrammatic view of the circuits and the operative parts included therein.

Instead of using spark-pins, as shown and described, the record-sheet might also be adapted to pass over the spark-point at the end of the needle. However, by using spark-pins, as shown, I am enabled to hermetically seal the instrument-case, thus preventing any disturbance whatever of the needle. As best shown in Fig. 2, the tops of the spark-pins 14 are elongated in the direction of travel of the record-sheet. I find that where these pins are pointed a zigzag record-line will result instead of a straight line. This is probably due to the spark seeking a side path of less resistance through the pores of the record-sheet instead of passing through the substance; but by elongating the pins, as shown, this sidewise tendency can at least be confined to those pores lying in the path of the straight record-line.

Although I have shown an air-gap between the record-sheet and the spark-pins 14, this is merely for the purpose of eliminating friction, which would otherwise result if the record-sheet passed in contact with the pins. It is also non-essential that a separate sheet of conductive record-paper be used, as the record-paper itself might be coated with carbon or coloring-matter. If the spark then jumped from the coated side, the marking material would be disrupted and carried away by the spark to expose the original coloring of the paper, and thus leave a record-mark. I am thus enabled to apply my invention to any instrument to make a continuous record of the readings thereof without interrupting the measurements which the instrument was primarily designed to give, and no friction is introduced, and no disturbance of the needle results. The record-sheet may be of any length, and the driving mechanism may be designed to run for any length of time. My device also is entirely devoid of delicate adjustments, such as abound in instruments of this kind in the prior art, and the circuit adjustments and parts are extremely simple and require no special skill for their installation.

Many modifications may be made in the arrangement and disposition of the various circuits and parts without departing from the scope of the invention, and I do not therefore wish to be limited to the arrangement and construction as herein shown.

I claim as new, however, and desire to secure by Letters Patent—

1. In an instrument of the class described, the combination with an indicating-needle, of means for recording the readings of said needle on a record-sheet by means of electrical discharges depositing marking material thereon.

2. In an instrument of the class described, the combination with an indicating-needle, of means for recording the readings of said needle on a record-sheet by means of electrical discharges passing through the record-sheet and depositing marking material thereon.

3. In an instrument of the class described, the combination with an indicating-needle, of means for intermittently causing electrical discharges to deposit marking material on a record-sheet at points corresponding to the varying positions of the indicating-needle.

4. In an instrument of the class described, the combination with an indicating-needle, of means for causing electric discharges to convey marking material to the record-sheet of the instrument to produce marks thereon corresponding to the positions of the indicating-needle.

5. In an instrument of the class described, the combination with an indicating-needle, of a plurality of spark-pins associated with a record-sheet and said needle, said spark-pins registering with record-divisions on said record-sheet, means for causing electric sparks to pass through said record-sheet and to said spark-pins, and means for causing marking material to be carried by the electric discharge and imprinted on said record-sheet, the position of said marks on the record-sheet corresponding to the positions of said indicating-needle.

6. In an instrument of the class described, the combination with an indicating-needle, of means for causing electric sparks to pass through the record-sheet of the instrument and to said needle, and means for causing marking material to be carried by the electric discharge and imprinted on said record-sheet in places corresponding to the positions of the indicating-needle on its indicating-scale.

7. In an instrument of the class described, the combination with an indicating-needle, of a spark-point on said needle insulated therefrom, means for causing electric sparks to pass through the record-sheet of the instrument and toward said spark-point, and means for causing marking material to be carried by the electric discharge and imprinted on said record-sheet in places corresponding to the positions of said indicating-needle on its indicating-scale.

8. In an instrument of the class described, the combination with an indicating-needle, of a spark-point at the end of said needle insulated therefrom, means for causing electric sparks to pass through the record-sheet of the instrument and toward said spark-point on said needle, and means for causing marking material to be carried by the electric discharge and deposited on said record-sheet in places corresponding to the positions of said indicating-needle over its scale.

9. In an instrument of the class described, the combination with an indicating-needle, of a spark-point extending from said needle but insulated therefrom, a plurality of spark-pins by which said point may travel as the needle moves over its scale, the record-sheet of the instrument being adapted to travel by said spark-pins, means for causing electric sparks to pass through said record-sheet to said spark-pins and from said spark-pins to the spark-point on said needle, and means for causing the electric discharge to convey marking material to said record-sheet to mark said sheet in places corresponding to the position of the needle over its scale when a spark passes.

10. In an instrument of the class described, the combination with an indicating-needle, of a spark-point extending from its end but insulated therefrom, a series of spark-pins disposed near the path of said spark-point but always separated therefrom by an air-gap, an additional series of spark-pins disposed in horizontal alinement and connected with corresponding spark-pins of the other series, the record-sheet on the instrument being adapted to travel over said horizontally-alined pins, means for causing sparks to pass from said record-sheet to the horizontally-alined spark-pins and from the corresponding other spark-pins to the spark-point on the needle, and means for causing marking material to be conveyed by the electric discharge to said record-sheet to mark said sheet in places corresponding to the positions of the needle over its scale when a spark passes.

11. In an instrument of the class described, the combination with a pivoted indicating-needle, of a spark-point extending from its end but insulated therefrom, a series of spark-pins disposed in the arc of a circle and near the path of said spark-point, each of said pins being disposed diametrically opposite a corresponding division on the scale of the instrument, the record-sheet of the instrument being adapted to travel over said spark-pins, marking material associated with said record-sheet, means for causing sparks to jump from said record-sheet toward said spark-pins and to the spark-point on said needle, and means for causing said marking material to be carried by the electric discharge and imprinted on the record-sheet in places corresponding to the position of the needle over its scale when a spark passes.

12. In an instrument of the class described, the combination with a pivoted indicating-needle inclosed in an air-tight case, of a spark-point extending from the end of said needle but insulated therefrom, a series of spark-pins disposed in the arc of a circle near the path of said spark-point but always separated therefrom by an air-gap, each of said spark-pins being diametrically opposite to a corresponding division of the scale of the instrument, an additional series of longitudinally-alined equally-spaced spark-pins, each connected with a corresponding spark-pin of the first series extending from the interior of said air-tight casing to the exterior thereof, the record-sheet of the instrument being adapted to travel at the outside of said air-tight case and over the horizontally-alined spark-pins but insulated therefrom by an air-gap, and means for causing electric sparks to pass through said record-sheet to the longitudinally-disposed pins and from the corresponding other pins to the spark-point on the needle whereby the record-sheet is marked in places corresponding to the position of the needle over its scale when a spark passes.

13. In an instrument of the class described, the combination with a pivoted indicating-needle, of a spark-point extending from its end but insulated therefrom, a series of spark-pins disposed in the arc of a circle and near the path of the spark-point as the needle swings but always separated from said point by an air-gap, each one of said pins being disposed diametrically opposite a corresponding division-point on the instrument-scale, an additional series of spark-pins horizontally alined and equally spaced and connected with corresponding spark-pins of the first series, the record-sheet of the instrument being adapted to travel over said horizontally-alined spark-pins but separated therefrom by an air-gap, marking material associated with said record-sheet, means for causing electric sparks to pass from said record-sheet to the horizontally-alined spark-pins and from the corresponding spark-pins of the first series to the spark-point of the needle, and means for causing the electric discharge to convey said marking material to be printed on said record-sheet in places corresponding to the position of the needle over its scale when each spark passes.

14. In an instrument of the class described, the combination with an indicating-needle provided with a spark-point extending and insulated therefrom, the record-sheet of the instrument being adapted to travel over said spark-point, means for repeatedly causing a spark to pass from the record-sheet toward said spark-point, marking material associated with said record-sheet, and means for causing electric discharge to convey said marking material, whereby the record-sheet is marked in places corresponding to the positions of the needle over the instrument-scale when the sparks pass.

15. In an instrument of the class described, the combination with an indicating-needle provided with a spark-point insulated therefrom, a series of spark-pins corresponding to the divisions of the instrument-scale and disposed in the path of the spark-point as the needle travels over its scale, the record-sheet of the instrument being adapted to travel by said spark-pins, marking material associated with said record-sheet, means for repeatedly causing electric sparks to pass from said record-sheet to said spark-pins and from the spark-pins to the spark-point on the needle, and means for causing said marking material to be carried by the electric discharge to the record-sheet whereby said sheet is marked in places corresponding to the positions of the needle over the scale when the sparks pass.

16. In an instrument of the class described, the combination with an indicating-needle provided with a spark-point insulated therefrom, a series of horizontally-alined spark-pins associated with said spark-point, said spark-pins being spaced proportionately and correspondingly to the divisions on the needle-scale, the record-sheet of the instrument being adapted to travel over said spark-pins so that the record-divisions thereon register with said spark-pins, marking material associated with said record-sheet, means for repeatedly causing an electric spark to jump from said record-sheet to that spark-pin nearest the spark-pin on the traveling needle, and means for causing the electric discharge to convey marking material whereby said record-sheet is marked at the division corresponding to the position of the spark-point on the needle when the spark passes whereby a record is obtained of the instantaneous individual readings of the indicating-needle.

17. In an instrument of the class described, the combination with an indicating-needle, of a spark-point extending from said needle, a series of spark-pins disposed near the path of said spark-point, said spark-pins being spaced correspondingly and proportionately to the divisions of the needle-scale, the record-sheet of the instrument being adapted to travel over said spark-pins so that the record-divisions thereon register with said spark-pins, a sheet treated with conductive marking material adapted to travel with said record-sheet, a circuit including said conductive sheet, said spark-pins, said spark-point, and the spark-gaps, and means for repeatedly causing an instantaneous current-flow through said circuit whereby a spark will repeatedly jump from the conductive sheet through the record-sheet to a spark-pin, and from the spark-pin to the spark-point on the needle, each spark jumping to that spark-pin nearest which the spark-point on the needle is disposed when the spark passes, marking material being conveyed by each electric discharge to the record-sheet to mark said sheet at places corresponding to the positions of the needle.

18. In an instrument of the class described, the combination with an indicating-needle, of a spark-point extending but insulated therefrom, a series of spark-pins spaced correspondingly and proportionately to the divisions of the needle-scale, the record-sheet of the instrument being adapted to travel over said spark-pins at a uniform rate, the record-divisions on said sheet registering with the spacing of said spark-pins, marking material associated with said record-sheet, a secondary circuit including said marking material, spark-pins, spark-points and the spark-gaps, a primary circuit associated with said secondary circuit, means associated with said primary circuit for repeatedly causing instantaneous current-flow through said secondary circuit whereby sparks pass from the marking material through the record-sheet to the spark-pins, and from the spark-pins to the spark-point, each spark passing from the record-sheet to that spark-pin nearest which the spark-point on the needle is disposed when the spark passes whereby the record-sheet is marked on the division corresponding to the scale-reading indicated by the needle when the spark passes.

19. In an instrument of the class described, the combination with a pivoted indicating-needle, of a spark-point extending from the end of said needle but insulated therefrom, a series of spark-pins disposed in the arc of a circle and near the path of said spark-point, each of said pins being disposed diametrically opposite a corresponding scale-division of the needle-scale, an additional series of horizontally-alined spark-pins each connected with a corresponding pin of the first series, the spacing of said horizontally-alined pins registering with the spacing of the divisions on the needle-scale, the record-sheet of the instrument being adapted to travel at a uniform rate over said horizontal spark-pins, a belt of conductive marking material adapted to travel with said record-sheet, a circuit including said marking material, said spark-pins, said spark-point and the spark-gaps, and means for repeatedly causing an instantaneous current-flow through said circuit whereby a spark repeatedly passes from the marking material to a spark-pin and from the corresponding other spark-pin to the spark-point on the needle, each spark passing from the record-sheet to that spark-pin connecting with the other spark-pin nearest which the swinging spark-point on the needle is disposed when the spark passes, the electric discharge carrying the marking material with it whereby the record-sheet is marked at a place corresponding to the scale-reading indicated by the needle when the spark passes, the successive sparks causing a record of the needle-readings to be traced on said record-sheet.

20. In an instrument of the class described, the combination with a pivoted indicating-needle provided with a section at its end insulated therefrom, a spark-point extending from the end of said insulated section, a second spark-point extending from said insulated section, a segmental conductor disposed near the path of said second spark-point, a series of sparking-pins disposed near the path of said first spark-point, each of said pins being disposed diametrically opposite to a corresponding division of the needle-scale, an additional series of horizontally-alined spark-pins each connected with a corresponding spark-pin of the first series, the spacing between said horizontally-disposed pins registering with the spacing of the scale-divisions, a record-sheet adapted to travel over said horizontally-disposed pins at a uniform rate, a belt of conductive marking material adapted to travel with said record-sheet, a circuit including said conductive belt, said spark-pins, said spark-points, said segmental conductor and the various spark-gaps, and means for repeatedly causing instantaneous current-flow through said circuit whereby sparks will jump the various gaps, each spark jumping from the conductive belt through the record-sheet and to that horizontal spark-pin connected with that spark-pin of the first series nearest which the spark-point at the end of the needle is disposed when the spark passes, marking material passing from said belt with said spark to mark the record-sheet at the division corresponding to the position of the needle over the scale when the spark passes, the successive sparks thus marking a continuous record of the instantaneous readings of the needle.

21. In an instrument of the class described, the combination with an indicating-needle provided with a spark-point insulated therefrom, the record-sheet of the instrument being associated with said spark-point, of a secondary circuit including said spark-point and gap, a primary circuit associated with said secondary circuit, a source of current in said primary circuit, a condenser of large capacity bridged about said source of current to be charged thereby, and slow-acting means for intermittently discharging said condenser through said primary circuit.

22. In an instrument of the class described, the combination with an indicating-needle provided with a spark-point, the record-sheet of the instrument being associated with said spark-point but separated therefrom at all times by an air-gap, of a circuit including said spark-point, said gap and the secondary winding of an induction-coil, a primary circuit including the primary winding of said induction-coil, a source of current included in said primary circuit, a condenser of large capacity bridged about said source of current, the inductance and resistance of said induction-coil being properly proportioned to the capacity of said condenser, and slow-acting means for intermittently discharging said condenser through said primary circuit.

23. In an instrument of the class described, the combination with an indicating-needle provided with a spark-point, the record-sheet of the instrument being associated with said spark-point but separated therefrom by an air-gap, of a circuit including said spark-point, said gap and the secondary winding of an induction-coil, a primary circuit including the primary winding of said induction-coil, a source of current and a high resistance included in said primary circuit, a condenser of large capacity shunted about said resistance and said source of current, and slow-acting means for intermittently discharging said condenser through the primary winding.

24. In an instrument of the class described, the combination with an indicating-needle provided with a spark-point at its end, of spark-contacts for said spark-point, a circuit adapted to include said spark-point and one of said spark-contacts, said contacts being disposed so that a surface thereof will be exposed to the spark-point whereby the resultant thrust of a spark or discharge-spray will be longitudinal with the axis of the needle whereby disturbance of the needle is prevented when a spark passes said needle being entirely independent of mechanical circuit connections.

25. In an instrument of the class described, the combination with an indicating-needle provided with a spark-point at its end but insulated therefrom, a series of spark-pins disposed near the path of said spark-point as the needle swings, the record-sheet of the instrument being adapted to travel over said spark-pins, a secondary circuit adapted to include said spark-point, said record-sheet and one of said spark-pins, a primary circuit associated with said secondary circuit, a source of current and a make-and-break mechanism included in said primary circuit, a condenser bridged across said source of current, mechanism for actuating said make-and-break mechanism at regular intervals and for causing travel of said record-sheet at a uniform rate over said spark-pins, each engagement of the contacts of said make-and-break mechanism causing a condenser discharge through said primary circuit whereby an instantaneous current is caused to flow through said secondary circuit whereby a spark will jump from the record-sheet to a spark-pin and from the spark-pin to the spark-point on the needle, each spark passing from the record-sheet to that spark-pin nearest which the spark-point on the needle is disposed when the spark passes whereby the record-sheet is marked by each spark at a place corresponding to the needle-reading, and means for causing the spark passing between a spark-pin and a spark-point on the needle to be in a direction longitudinal with the axis of the needle whereby disturbance of the needle is prevented.

26. In an instrument of the class described, the combination with an indicating-needle provided with a spark-point at its end but insulated therefrom, a series of spark-pins disposed near the path of said spark-point as the needle swings, the record-sheet of the instrument being adapted to travel over said spark-pins, a secondary circuit adapted to include said spark-point, said record-sheet and one of said spark-pins, a primary circuit associated with said secondary circuit, a source of current and a make-and-break mechanism included in said primary circuit, a condenser bridged across said source of current, mechanism for actuating said make-and-break mechanism at regular intervals and for causing travel of said record-sheet at a uniform rate over said spark-pins, each engagement of the contacts of said make-and-break mechanism causing a condenser discharge through said primary circuit whereby an instantaneous current is caused to flow through said secondary circuit whereby a spark will jump from the record-sheet to a spark-pin and from the spark-pin to the spark-point on the needle, each spark passing from the record-sheet to that spark-pin nearest which the spark-point on the needle is disposed when the spark passes whereby the record-sheet is marked by each spark at a place corresponding to the needle-reading, and means for causing the contact-points to present a spark-surface to the spark-point on the needle whereby the resultant spark will be in a direction longitudinal with the axis of the needle whereby disturbance of the needle is prevented when current flows through said secondary circuit.

27. In an instrument of the class described, the combination with an indicating-needle inclosed in an air-tight case, the record-sheet of said instrument being adapted to travel at the outside of said case, of means for recording readings of said needle on said record-sheet by means of electric discharges carrying marking material to said sheet at points corresponding to the varying positions of said needle, said needle being entirely independent of extraneous mechanical connection.

28. In an instrument of the class described, the combination with an indicating-needle, of means for recording the readings of said needle on a record-sheet by means of electrical discharges passing through said sheet and depositing marking material thereon said needle being entirely independent of extraneous mechanical connections.

29. In an instrument of the class described, the combination with an indicating-needle, of means for causing electrical discharges to pass through the record-sheet of the instrument and to said needle, and means for causing marking material to be carried by said discharges and imprinted on and in said record-sheet in places corresponding to the positions of the indicating-needle on its indicating-scale.

30. In an instrument of the class described, the combination with an indicating-needle, of marking material associated with the record-sheet of the instrument, means for positively charging said marking material, and means for discharging said marking material through said record-sheet and to the needle, said marking material being carried with the discharge and imprinted on the record-sheet.

31. In an instrument of the class described, the combination with an indicating-needle, of marking material, and means for recording the readings of said needle on the record-sheet of the instrument by means of electric discharges which pass through the record-sheet and carry with them some marking material to leave marks on the record-sheet.

32. In an instrument of the class described, the combination with an indicating-needle, of a spark-point extending from said needle, a plurality of spark-pins by which said point may travel, the record-sheet of the instrument being adapted to travel by said spark-pins, marking material for said record-sheet, and means for recording the readings of said needle on said record-sheet by means of electric discharges which pass through the record-sheet and to the spark-pins to carry with them some marking material to leave marks on the record-sheet, the ends of said spark-pins being elongated in the direction of travel of the record-sheet.

33. In an instrument of the class described, the combination with an indicating-needle provided with a spark-point, the record-sheet of the instrument being associated with said spark-point but separated therefrom by an air-gap, of secondary circuit including said spark-point and gap, a primary circuit associated with said secondary circuit, a source of current and a primary winding in said primary circuit, a condenser bridged about said source of current to be charged thereby, means for intermittently discharging said condenser entirely through said primary winding, whereby electrical discharge will pass through the air-gap, and the record-sheet, and marking material carried by the discharge will be deposited on said record-sheet.

34. In an instrument of the class described, the combination with an indicating-needle provided with a spark-point, of a spark-contact separated from said spark-point by an air-gap, the record-sheet of the instrument being adapted to travel near said spark-contact, a secondary circuit including said spark-point, said gap, said contact and the secondary winding of an induction-coil, a source of current and a primary winding included in said primary circuit, a condenser permanently bridged about said source of current, means for intermittently discharging said condenser entirely and only through said primary circuit whereby electrical discharges are caused to pass between said spark point and contact and to the record-sheet, and marking material disposed to be carried by said discharges to be deposited on the record-sheet.

35. In an instrument of the class described, the combination with an indicating-needle provided with a spark-point, spark-contacts for said spark-point, the record-sheet of the instrument being adapted to travel near said spark-contacts, a secondary circuit for including said spark-point, spark-contacts, a primary circuit for said secondary circuit, a source of current and a primary winding in said primary circuit, a condenser permanently bridged about said source of current to be charged thereby, make-and-break mechanism included in said primary circuit for intermittently discharging said condenser entirely through said primary winding whereby electrical discharges are caused to pass between the spark point and contacts and to the record-sheet, and marking material disposed to be conveyed by said discharges to be deposited on said record-sheet.

36. In an instrument of the class described, the combination with an indicating-needle provided with a spark-point, of spark-contacts for said spark-point, the record-sheet of the instrument being adapted to travel near said spark-points, a secondary circuit including said spark-point, spark-contacts, a primary circuit including a primary winding, a source of current and a high resistance included in said primary circuit, a condenser permanently shunted about said resistance and said source of current, circuit-closing mechanism for intermittently discharging said condenser through the primary winding whereby electrical discharges are caused to pass between the spark point and contacts to the record-sheet, and marking material disposed to be conveyed by said discharges and deposited on said record-sheet.

37. In an instrument of the class described, the combination with an indicating-needle, of a sheet coated on one side with conductive marking material, means for positively charging said sheet, and means for discharging said sheet to the needle, the discharge causing the marking material to be electrically conveyed from the sheet to leave marks thereon at points corresponding to the positions of the needle.

38. In an instrument of the class described, the combination with an indicating-needle, of marking material, and means for causing electrical discharges to convey marking material to a traveling record-sheet on a line at right angles to the travel of the record sheet.

39. The combination with an instrument-case, of an indicating-needle at the interior thereof provided with a spark-point, a series of spark-contacts for said spark-point in a line at right angles to the direction of travel of a record-sheet which is adapted to pass longitudinally over the contacts, conductive marking material associated with said record-sheet, a circuit for including said marking material, said spark-contacts, spark-point and the air-gaps, and means for periodically discharging current through said circuit, whereby said marking material is electrically conveyed to be imprinted on said record-sheet.

40. In an instrument of the class described, the combination with an indicating-needle provided with a spark-point, of a second spark-point separated from said needle by an air-gap, the record-sheet of the instrument being adapted to travel near said second spark-point, a secondary circuit including said spark-points and a secondary winding, a primary winding associated with said secondary winding, a primary circuit including said primary winding and a source of current, means for inducing a spark at said spark-points upon closure of said primary circuit, and marking material disposed to be carried by the electrical discharges and deposited on said record-sheet.

41. In an instrument of the class described, the combination with an indicating-needle provided with a spark-point, of a second spark-point separated from said needle-point by an air-gap, the record-sheet of the instrument being adapted to travel near said second spark-point, a secondary circuit including said spark-points and a secondary winding, a primary circuit including said primary winding and a source of current, a condenser, means associated with said source of current and said condenser for causing discharge to pass between said spark-points upon closure of the primary circuit, and marking material disposed to be conveyed by said discharges and deposited on the record-sheet.

42. In an instrument of the class described, the combination with an indicating-needle provided with a spark-point, of a second spark-point separated from said needle-point by an air-gap, the record-sheet of the instrument being adapted to travel near said second spark-point, a secondary circuit including said spark-points, a primary circuit associated with said secondary circuit, a source of current in said primary circuit, a condenser associated with said primary winding and said source of current, a make-and-break mechanism, closure of said make-and-break mechanism causing a discharge between said spark-points and through the record-sheet, and marking material carried by said discharge and deposited on the record-sheet.

43. In an instrument of the class described, the combination with an indicating-needle provided with a spark-point, of a second spark-point separated from said needle and spark-point by an air-gap, the record-sheet of the instrument being adapted to travel near said second spark-point, a secondary circuit including said spark-points, air-gap and the secondary winding, a primary winding associated with said secondary winding, a primary circuit including said primary winding and a source of current, a condenser of large capacity permanently bridged about said source of current to be charged thereby, make-and-break mechanism in said primary circuit for intermittently discharging said condenser through said primary winding whereby electrical discharges are caused to pass between the spark-points and to the record-sheet, and marking material conveyed by said discharges to be deposited on the record-sheet in places corresponding to the varying positions of the needle.

44. In an instrument of the class described, the combination with an indicating-needle provided with a spark-point, of a second spark-point separated from said needle and spark-point by an air-gap, the record-sheet of the instrument being adapted to travel near said second spark-point, a secondary circuit including said spark-points and air-gap and a secondary winding, a primary winding associated with said secondary winding, a primary circuit including said primary winding and a source of current, a condenser of large capacity permanently bridged about said source of current to be charged thereby, make-and-break mechanism of low frequency in said primary circuit for intermittently discharging said condenser through said primary winding whereby electrical discharges are caused to pass between the spark-points and to the record-sheet, and marking material conveyed by said discharges to be deposited on the record-sheet.

45. In an instrument of the class described, the combination with an indicating-needle provided with a spark-point insulated therefrom, the record-sheet of the instrument being associated with said spark-point but separated therefrom by an air-gap, a secondary circuit including said spark-point and gap, a primary circuit associated with said secondary circuit, a source of current in said primary circuit, a condenser of large capacity bridged about said source of current to be charged thereby, means for intermittently discharging said condenser through the primary circuit whereby electrical discharges pass from the spark-point and through the record-sheet, and marking material conveyed by said discharges and deposited on said record-sheet in places corresponding to the positions of the needle.

46. In an instrument of the class described, the combination with an indicating-needle provided with a spark-point, the record-sheet of the instrument being associated with said spark-point but separated therefrom by an air-gap, of a circuit including said spark-point, said gap and the secondary winding of an induction-coil, a primary circuit including the primary winding of said induction-coil, a source of current and a high resistance included in said primary circuit, a condenser of large capacity shunting said resistance and said source of current, means for intermittently discharging said condenser through the primary winding whereby electrical discharges are caused to pass from the spark-point through the record-sheet, and marking material conveyed by said discharge and deposited on the record-sheet in places corresponding to the positions of the needle.

47. In an instrument of the class described, the combination with an indicating-needle provided with a spark-point adapted to travel transversely to the direction of travel of the record-sheet of the instrument, stationary spark-points by which the needle spark-point travels, means for causing the record-sheet to travel at a uniform rate over the stationary spark-points, a secondary circuit including the spark-points and a secondary winding of an induction-coil, a primary circuit including the primary winding of the induction-coil, a condenser of large capacity associated with the primary circuit, slow-acting means for charging said condenser with a small current-flow and for intermittently connecting the condenser upon saturation thereof with the primary circuit, whereby a comparatively large current-flow is caused between the spark-points causing electrical discharges to pass through the record-sheet to mark said sheet at places corresponding to the varying positions of the indicating-needle.

48. In an instrument of the class described, the combination with an indicating-needle provided with a spark-point adapted to move transversely to the direction of travel of the record-sheet of the instrument, stationary spark-points by which said needle spark-point travels, means for causing the record-sheet to travel near the spark-points, a secondary circuit including the spark-points and a secondary winding of an induction-coil, a primary circuit including the primary winding of the induction-coil, a condenser of large capacity included in the primary circuit, a source of current permanently bridged about the condenser, means for causing small current-flow from said source to charge said condenser, and make-and-break mechanism of low frequency in the primary circuit for intermittently connecting the condenser upon saturation thereof with the primary winding whereby electrical discharges of comparatively large current capacity will flow between the spark-points and through the record-sheet to mark said record-sheet at places corresponding to the varying positions of the needle.

49. In an instrument of the class described, the combination with an indicating-needle provided with a spark-point adapted to travel transversely to the direction of travel of the record-sheet of the instrument, stationary contact-points by which the needle-point travels, means for causing the record-sheet to travel near the spark-points, a secondary circuit including said spark-point and the secondary winding of an induction-coil, a primary circuit including the primary winding of the induction-coil, a condenser of large capacity included in the primary circuit, make-and-break mechanism also included in the primary circuit, a source of current permanently bridged about the condenser, and means for causing comparatively small current-flow from said source to charge the condenser, said make-and-break mechanism serving to intermittently connect the charged condenser with the primary circuit, whereby electrical discharges pass between the spark-points and through the record-sheet, said make-and-break mechanism being of comparatively slow speed whereby said condenser is allowed to become saturated and thereby to cause comparatively great current-flow through the primary circuit and between the spark-points.

50. In an instrument of the class described, the combination with an indicating-needle provided with a spark-point adapted to travel transversely to the direction of travel of the record-sheet of the instrument, stationary spark-points by which the needle spark-point travels, clockwork for causing said record-sheet to travel over the spark-points, a secondary circuit including said spark-points and the secondary winding of an induction-coil, a primary circuit including the primary winding of the induction-coil, a condenser of large capacity included in the primary circuit, make-and-break mechanism driven by said clockwork and also included in the primary circuit, a source of current bridged about said condenser, and means for causing small current-flow from said source to charge the condenser, said make-and-break mechanism serving to intermittently discharge the condenser through the primary winding whereby electrical discharges pass between the spark-points and through the record-sheet, the frequency of said make-and-break mechanism being comparatively low to allow the condenser to become saturated before the discharge thereof, whereby comparatively large current-flow will pass through the primary circuit and between the spark-points.

51. In an instrument of the class described, the combination with an indicating-needle provided with a spark-point adapted to travel transversely over the record-sheet of the instrument, stationary spark-points by which a needle spark-point travels, means for causing the record-sheet to travel at a uniform rate near the stationary spark-points, a secondary circuit including the spark-points and a secondary winding of an induction-coil, a primary circuit including the primary winding of the induction-coil, a condenser of large capacity associated with the primary circuit, means for charging said condenser with a small current-flow, means for intermittently connecting the condenser upon saturation thereof with the primary circuit, whereby a comparatively large current-flow is caused between the spark-points causing electrical discharges to pass through the record-sheet, and marking material adapted to be conveyed by the electric discharges and deposited on the record-sheet in places corresponding to the varying positions of the needle.

52. In an instrument of the class described, the combination with an indicating-needle, of marking material carried by a traveling sheet, and means for causing electrical discharges between said sheet and said needle, said electrical discharges conveying the marking material from said sheet to leave marks thereon corresponding to the varying positions of the needle over its scale.

53. In an instrument of the class described, the combination with an indicating-needle, of marking material associated with a record-sheet of the instrument, means for repeatedly charging the marking material, and means for repeatedly discharging said marking material to cause electrical discharges to pass toward the needle to convey marking material to mark the record-sheet at points corresponding to the varying positions of the needle on its scale.

54. In an electrical measuring instrument, the combination with an indicating-needle, of spark-points associated with the needle and with a record-sheet of the instrument, marking material associated with the spark-points and with the record-sheet, and spark-producing means for causing electrical discharges to carry marking material to form marks on the record-sheet in places corresponding to the varying positions of the needle over its scale.

55. In an electrical measuring instrument, the combination with an indicating-needle, of spark-points associated with said needle, marking material, a record-sheet of the instrument being adapted to travel between the marking material and the spark-points, means for positively charging said marking material, and means for repeatedly discharging the marking material whereby electrical discharges pass from the marking material toward the spark-points to convey marking material to the record-sheet whereby the record-sheet is marked at points corresponding to the varying positions of the needle on its scale.

56. In an electrical measuring instrument, the combination with an indicating-needle, of spark-points associated therewith, marking material associated with a record-sheet disposed near said spark-points, and means for repeatedly charging said marking material and for discharging said marking material whereby said marking material is effected to leave marks on the record-sheet at points corresponding to the varying positions of the needle on its scale.

57. In a measuring instrument, the combination with a movable element, of spark-points associated with said movable element, marking material, a record-sheet associated with the spark-points and the marking material, and means for causing current-flow through a circuit associated with the spark-points and marking material, current-passage through said circuit causing conveyance of marking material to produce marks on the record-sheet corresponding to the varying positions of the movable element.

58. In a measuring instrument, the combination with a movable element, of spark-points associated therewith, a record-sheet associated with the spark-points and treated with a substance, means for causing repeated current-flow through a circuit associated with the spark-points, and means upon current-flow through said circuit for causing removal of the substance from the record-sheet in spots corresponding to the varying positions of the movable element.

59. In an electrical measuring instrument, the combination with a movable element, of spark-points associated therewith, a record-sheet of the instrument being associated with the spark-points, marking material associated with the record-sheet, a circuit associated with the spark-points and marking material, spark-producing means for causing electrical discharges to pass between the spark-points and the marking material, and means for causing the current-flow in one direction between said spark-points to be greater than in the opposite direction whereby the marking material will be conveyed to the record-sheet and remain thereon to form marks corresponding to the varying positions of the movable element.

60. In a measuring instrument, the combination with a movable element, of spark-points associated therewith, marking material, a circuit of which the spark-points form one terminal and the marking material the other terminal, a record-sheet of the instrument being disposed between the marking material and the spark-points, current-producing means for said circuit for causing electrical discharges to pass between the marking material and spark-points, said marking material being conveyed by electrical discharges and disposed on the record-sheet, and means for causing the total current-flow to be greater from the marking material toward the spark-points, whereby to prevent the reconveyance of marking material from the record-sheet.

61. The combination with a movable indicating member, of marking material associated with a record-sheet for the movable member, means for producing electrical discharges, and means for causing said electrical discharges to physically change the marking material to cause marks to be formed thereby on the record-sheet, said marks corresponding with the positions of the indicating member.

In witness whereof I hereunto subscribe my name this 10th day of February, A. D. 1904.

GEORGE M. WILLIS.

Witnesses:
CHARLES J. SCHMIDT,
HARVEY L. HANSON.